United States Patent Office 3,733,202
Patented May 15, 1973

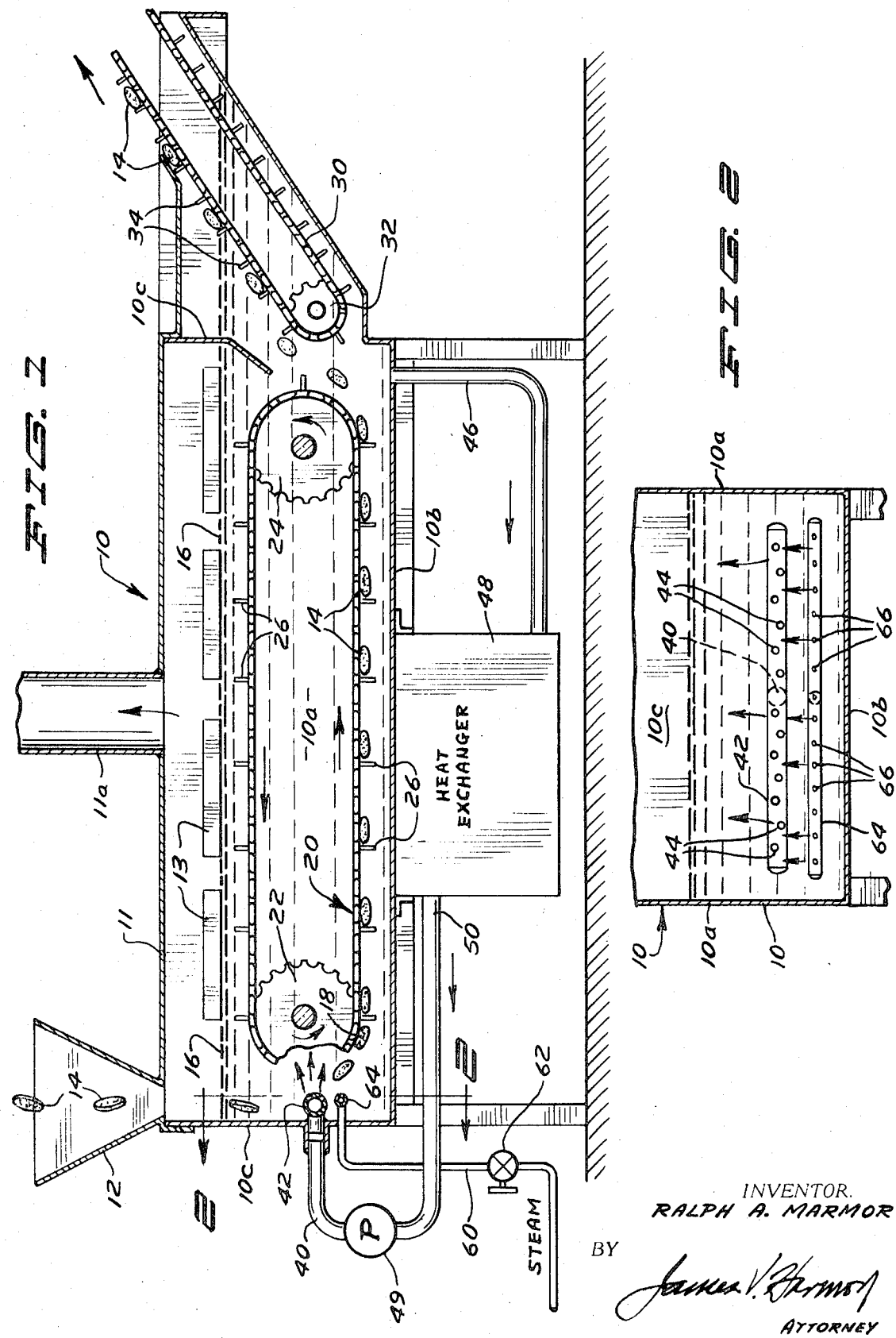

3,733,202
DEEP FAT FRYING PROCESS
Ralph A. Marmor, Minneapolis, Minn., assignor to The Pillsbury Company, Minneapolis, Minn.
Continuation-in-part of abandoned application Ser. No. 820,113, Apr. 29, 1969. This application Nov. 18, 1970, Ser. No. 90,772
Int. Cl. A23l *1/00;* C09f *5/12*
U.S. Cl. 99—1     6 Claims

ABSTRACT OF THE DISCLOSURE

A deep fat fryer composed of a frying vessel having side and bottom walls and a hood. An external heat exchanger and pump are connected to the vessel for heating the fat and passing it through the vessel. A provision is made for introducing a small amount of moisture into the fat at the point where the fat enters the vessel to distill off undesired fat breakdown products. The moisture is preferably introduced as steam through a manifold located at the inlet end of the frying vessel. As the steam escapes, it carries away the products of fat degradation and at the same time fills the hood thus lessening oxidation that would otherwise occur on the surface of the fat.

---

This is a continuation-in-part of a prior application filed Apr. 29, 1969, Ser. No. 820,113, under the same title, now abandoned.

The present invention relates to cooking equipment and more particularly to a deep fat fryer and a frying process.

The oxidation of fats and oils has been a long-standing problem particularly when the fat or oil is heated as it is in a deep fat fryer. The rate of oxidation is influenced by the amount of oxygen present, the presence of light, heat, metal contaminants and the like and the amount of antioxidant present. Even at freezing temperatures, fats oxidize but at the temperatures used for frying, e.g., 300–500° F., the shelf life of some fats may only be a matter of minutes in the presence of certain contaminants.

Normally, as fats oxidize, several chemical and physical changes occur. Some of these changes are: (a) an increase in the free fatty acid content, (b) an increase in the peroxide value, (c) an increase in viscosity, (d) a change in color (usually darkening, but the color may become lighter if oxidation is severe), (e) decrease in the iodine value, and (f) the formation of many and varied decomposition products such as aldehydes and ketones. Of these changes, the presence of the decomposition products is the most important in reducing the shelf life of the fat. Some of the decomposition products are pro-oxidants and can serve as catalysts that act to increase the rate of fat oxidation. Accordingly, it is important to prevent the formation of decomposition products where possible and to remove them after they are formed.

The presence of decomposition products is a particular problem in the case of cooking of foods which contain little or no moisture, such as shrimp, doughnuts or chicken as contrasted with potato chips which themselves give off a large amount of moisture when fried. The invention is thus particularly useful for products of this kind.

While it has been previously proposed to continuously circulate a frying oil from a frying vessel into a small tank and to introduce a certain amount of moisture into this tank for the purpose of removing the decomposition products, this equipment is relatively complicated in construction, expensive to manufacture, and does nothing to prevent or reduce fat oxidation at the surface of the cooking vessel.

In accordance with the present invention, moisture is introduced directly into the cooking fat within the frying vessel and the resulting steam is allowed to escape into a confined space above the cooking vessel. To this end the cooking vessel itself is provided with a hood for collecting the escaping steam and the steam present under the hood and above the fat will effectively reduce oxidation at the surface of the fat and at the same time carry away undesired decomposition products already present.

In view of these and other deficiencies of the prior art the present invention has among its objects the following characteristics and advantages: (a) the ability to reduce free fatty acids and to lower the peroxide value of cooking fat which contains substantial quantities of a decomposition product, (b) the requirement for very little equipment in addition to that required in a deep fat fryer not embodying the invention, (c) the provision of an oxygen-free protective atmosphere above the fat in the cooking vessel, (d) the ability to operate with safety over extended periods of time, (e) the ability to introduce widely varying amounts of moisture without water collecting in the ducts or heat exchanger which, if allowed to occur, could produce an explosion hazard and (f) the provision of an oxygen-free protective atmosphere over the fat in the cooking vessel during warm-up prior to introducing food products to the vessel and during shutdown as well as when products containing little or no moisture are processed.

In the figures:
FIG. 1 is a vertical sectional view of a fryer embodying the invention, and
FIG. 2 is a vertical sectional view taken on line 2—2 of FIG. 1.

Briefly, the present invention provides a deep fat fryer having a frying vessel with a provision for introducing a small amount of moisture directly into the fat within the vessel to provide the vehicle for distilling off undesired fat breakdown products which produce rancidity. The moisture is preferably introduced as steam through a manifold located at the inlet end of the frying vessel. As the steam escapes, it carries off the products of fat degradation and at the same time forms a protective oxygen-free blanket above the surface of the fat. Thus, in accordance with the invention oxidation is reduced at the upper surface of the hot cooking fat within an enclosed food frying vessel partly filled with hot cooking fat and cooking fat decomposition products are carried away from the hot cooking fat by:

Continuously flowing moisture, additionally to any moisture present in food being fried in the hot cooking fat, into the hot cooking fat while maintaining the temperature of the hot cooking fat above the boiling point of water at the pressure within the frying vessel;

Allowing the moisture to bubble up as steam through the hot cooking fat to the space within the frying vessel above the upper surface of the hot cooking fat, carrying with it decomposition products from the hot cooking fat;

Withdrawing the steam and decomposition products entrained therein from said space at such a rate relative to the flow rate of said moisture into the hot cooking fat that a blanket of substantially oxygen-free steam is maintained in contact with the upper surface of the hot cooking fat regardless of whether any food is being fried in the hot cooking fat and regardless of whether any food being fried in the cooking fat naturally contains moisture.

In this way, moisture is introduced in addition to and independently of any moisture that may be introduced by the food itself.

Although moisture can be added as liquid water, the addition of moisture in the form of steam is preferred because steam is usually more pure than water and does not absorb as much heat from the fat. Moreover, the possibility of water remaining in the oil when the oil passes through the heat exchange is lessened. The distillation process will, moreover, start as soon as the steam contacts the oil.

The steam used should be free from residual boiler compounds. It should not contain dissolved or entrapped air and must be under sufficient pressure to be forced into the kettle. The temperature of the steam is not important as long as the steam is reasonably dry. The steam is preferably admitted at the inlet or product feed-in end of the kettle and is preferably introduced across the entire width of the kettle under the surface of the oil. This can be accomplished by admitting the steam into the frying vessel through a perforated or porous sintered stainless steel plate.

Since it is necessary to maintain the oil in the vessel at the proper frying temperature (about 350° F.), the oil is preferably heated and circulated through the kettle for a period of several minutes to about 2 hours before the oil reaches frying temperature, i.e., before any product is introduced. The oxidation products that are formed during this period of time in conventional frying will normally remain in the oil. On the other hand, with the present invention, steam is injected as soon as the oil temperature reaches the boiling temperature of water. Thus, the steam will distill off most of the oxidation products that are formed during the warm-up period. When the kettle is shut down by turning off the heat exchanger, the steam is fed to the kettle until the oil temperature drops to near the boiling temperature of water.

In many commercial operations, it is frequently necessary to stop a frying process due to mechanical failures, varying demands for the product, shift scheduling and for other reasons. In accordance with the present invention, steam flow continues during any interruption of frying to distill off the volatile decomposition products that are formed.

As steam is fed to the kettle, the free fatty acid content of the fat will be reduced as determined by standard tests. Moreover, the peroxide value of the fat will be lowered. In one case the peroxide value was reduced from 3.4 to 1.8 after introducing moisture at the rate of 20 to 30 pounds per hour into a frying fat consisting of 400 pounds of a triglyceride composed of 75% of palmitic and esteric acid and 25% oleic acid (Durkex 500).

It is preferred that the moisture be introduced about half way between the top and bottom surfaces of the fat in the vessel.

The steam inlet is preferably below the hot oil inlet whereby the steam can pass upwardly through the stream of oil that is being introduced. The current of oil will also serve to transport the moisture from the feed-in end to the outlet end of the vessel.

I am careful to eliminate air from the steam being introduced because air, if present, would cause oxidation which, of course, the invention is designed to prevent. Other impurities should also be avoided since they could have a tendency to catalyze undesired reactions.

The temperature of the steam is not considered critical but dry steam (above 220° F.) is preferred because the presence of water could cause fat hydrolysis in the heat exchanger where the temperature of the fat is substantially higher than in the cooking vessel.

The amount of water to be used is not considered critical since any amount produces some benefit. Greater amounts, of course, produce a greater effect. Ordinarily, it is not desirable to use more than about one pound of water for each pound of fat per hour thus, in a typical frying operation using a kettle that holds 1600 pounds of fat, about 1600 pounds of steam would be used per hour of operation.

A specific example of the invention will now be described in connection with the figures.

Shown in FIGS. 1 and 2 is a frying kettle or vessel 10 composed of side, bottom and end walls 10a, 10b, 10c respectively and having a hood 11 with an exhaust stack 11a. A hopper 12 is provided at the inlet end of the hood 11 to receive food product 14 that is to be fried. If desired, windows 13 can be provided in the hood 11. The food product introduced to the vessel 10 falls into the liquid fat 16 and initially passes downwardly at 18 beneath an endless chain conveyor 20 entrained over driven sprockets 22 and 24. The chain conveyor is provided with a plurality of outwardly extending lugs 26 that carry the product from the inlet end of the kettle to the outlet end, i.e., from left to right as seen in FIG. 1. The product is then carried out of the apparatus by an inclined endless chain conveyor 30 which is entrained at its lower end over sprocket 32. The conveyor 30 like the conveyor 20 is provided with a plurality of spaced carrier lugs 34.

During operation, fat 16 is pumped into the kettle 10 through an inlet line 40 which communicates with a fat distribution manifold 42 composed of a pipe having a plurality of openings 44 along its length. This distributes the incoming fat across the width of the kettle 10.

The fat flows out of the apparatus through an outlet duct 46 to a heat exchanger 48 in which the temperature of the fat is elevated to the desired level (generally about 350° F.). It is then transferred by a pump 49 through a duct 50 back to the inlet line 40.

As soon as the temperature of the fat reaches about 212° F. during the warming up process, steam is injected directly into the kettle through a line 60. The feed rate is controlled by a valve 62. From line 60 the steam enters a distribution manifold 64 having a plurality of openings 66 for introducing the steam into the fat 16 throughout the entire width of the kettle 10. As the steam bubbles into the fat, it will pass upwardly through the stream of freshly introduced oil as best seen in FIG. 1.

During shutdown, the heat exchanger is turned off first. While the oil continues to circulate, steam is injected continuously until the oil temperature has reached about 212° F. at which time the valve 62 is closed.

It will be seen that steam bubbling up through the fat will fill the entire space between the upper surface of the fat 16 and the hood 11 thereby providing a protective oxygen-free atmosphere above the surface of the fat.

The invention provides a number of advantages. It can be added to a conventional deep fat fryer with relatively little cost and yet will effectively reduce the quantity of contaminants present in the fat as well as providing an oxygen barrier thereby extending the life of the fat and producing a better quality fried product.

I claim:

1. A method for reducing oxidation at the upper surface of cooking fat and for the removal of fat decomposition products within an enclosed food frying vessel containing fat, prior to and after food is added to the vessel, comprising the steps of:

heating fat in the food frying vessel from room temperature to a frying temperature of at least about 300° F.;

introducing food to be fried into said vessel when the fat in said vessel reaches said frying temperature;

continuously flowing moisture, additionally, to any moisture present in said food being fried in the hot cooking fat, directly into the hot cooking fat in said vessel as soon as the fat during the warm-up period has reached a temperature of about 212° F. and thereafter maintaining said continuous flow of moisture through the remainder of the warm-up period and through the frying period and until the temperature drops back to about 212° F. during the shutdown period;

allowing the moisture to bubble up as steam through the hot cooking fat to the space within the frying vessel above the upper surface of the hot cooking fat, carrying with it decomposition products from the hot cooking fat;

withdrawing the steam and decomposition products entrained therein from said space at such a rate relative to the flow rate of said moisture into the hot cooking fat that a blanket of substantially oxygen-free steam is maintained in contact with the upper surface of the hot cooking fat throughout the frying period as well as through a portion of both the warm-up and shut-down periods to cause the reduction of surface oxidation and the removal of decomposition products regardless of whether any food being fried in the cooking fat naturally contains moisture.

2. The process of claim 1 wherein the fat within the vessel is circulated continuously from the inlet end of the vessel to the outlet end of the vessel and the moisture is introduced to the inlet end of the vessel to carry the moisture through the kettle.

3. The process of claim 1 wherein the fat is circulated through the vessel and the fat is introduced into the vessel at a point above the point at which the moisture is introduced whereby the vaporized moisture will flow upwardly through the stream of fat introduced into the vessel and thereby continuously remove decomposition products.

4. The process of claim 1 wherein the moisture is introduced as steam.

5. The process of claim 4 wherein the steam is dry steam.

6. The process of claim 1 wherein the moisture is introduced in the form of steam and the oil is circulated continuously through the vessel.

References Cited

UNITED STATES PATENTS

| | | | |
|---|---|---|---|
| 3,353,962 | 11/1967 | Smith, Jr. | 99—100 P |
| 2,767,095 | 10/1956 | Smith, Jr. | 99—100 |
| 3,431,835 | 3/1969 | Angold | 99—107 UX |
| 3,376,806 | 4/1968 | Magnusson | 99—408 |
| 2,853,937 | 9/1958 | Peck | 99—404 |
| 3,231,390 | 1/1966 | Hoover | 99—1 |
| 3,259,521 | 7/1966 | Crall | 99—408 X |
| 3,480,446 | 11/1969 | Hollenbeck | 99—1 X |

OTHER REFERENCES

Bailey's Industrial Oil and Fat Products, 3rd ed., 1964, Interscience Publishers, edited by Swein, pp. 720–721.

FRANK W. LUTTER, Primary Examiner

S. L. WEINSTEIN, Assistant Examiner

U.S. Cl. X.R.

99—92, 100 P, 107, 118, 404, 408; 210—DIG. 8; 260—428